Jan. 7, 1969　　　J. J. DOGGETT ET AL　　　3,420,489
ADJUSTABLE BOLT ASSEMBLY FOR BATTERY SUPPORTING BRACKET
Filed June 5, 1967
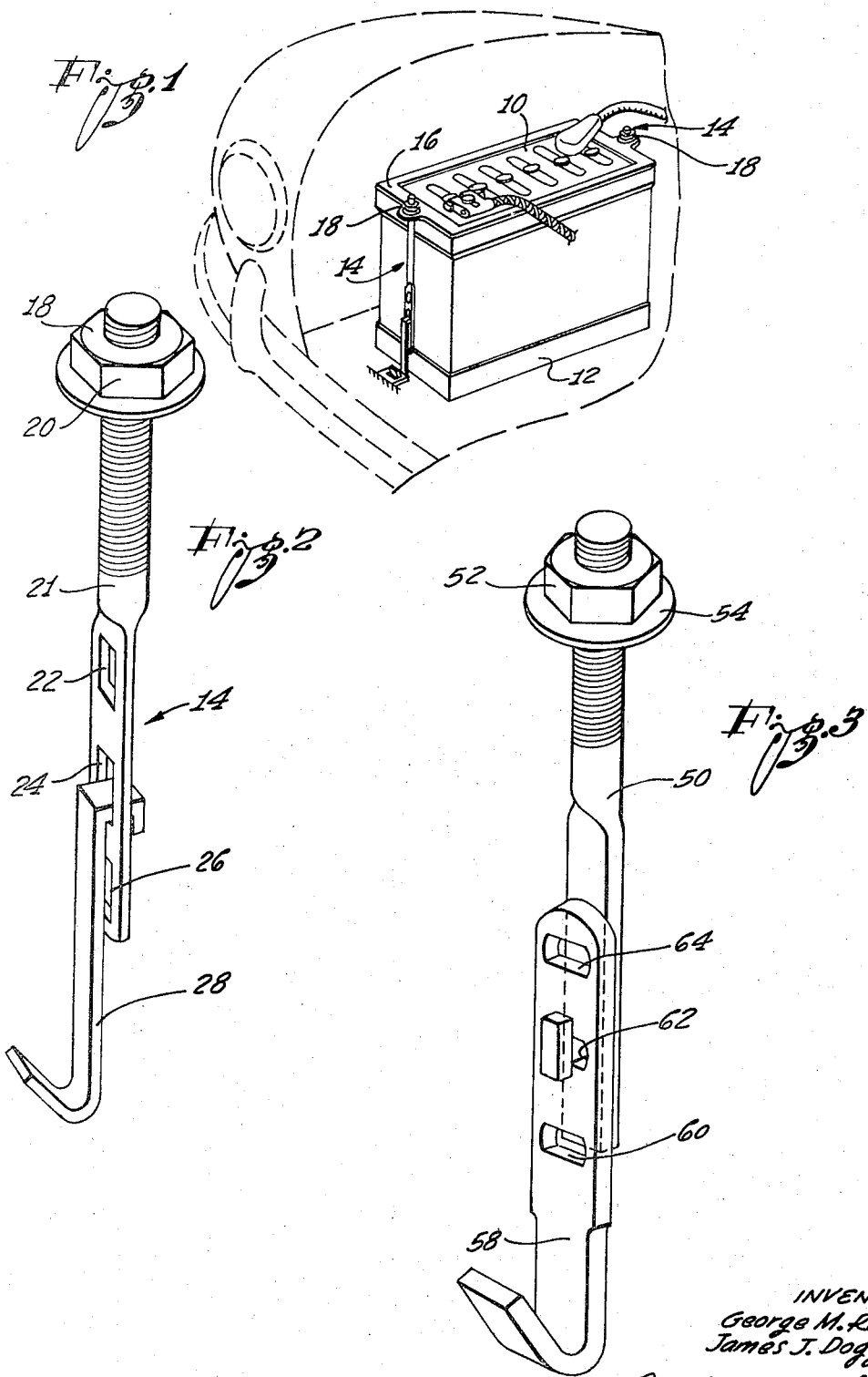
INVENTORS:
George M. Raptis
James J. Doggett
ATTORNEY United States Patent Office 3,420,489
Patented Jan. 7, 1969

3,420,489
ADJUSTABLE BOLT ASSEMBLY FOR BATTERY
SUPPORTING BRACKET
James J. Doggett and George Meletios Raptis, Pacific Palisades, Calif., assignors to James J. Doggett & George M. Raptis, Pacific Palisades, Calif., a partnership
Filed June 5, 1967, Ser. No. 643,634
U.S. Cl. 248—361                 4 Claims
Int. Cl. B60r 11/00

ABSTRACT OF THE DISCLOSURE

An improved non-corrosive bolt assembly for use in a storage battery supporting bracket is described herein; for mounting storage batteries in motor vehicles, and the like; the bolt assembly being adjustable to receive a wide variety of battery sizes.

Background of the invention

For many years, the storage battery of a motor vehicle has been mounted in the vehicle by supporting it on a pan; and by providing a pair of metal bolts which hook into the sides of the pan. The upper ends of the bolts pass through apertures in a metal strap, or bracket, which extends across the top of the battery; and nuts are threaded onto the upper ends of the bolts and down against the strap, so as to hold the battery firmly on the pan.

The disadvantage of the prior art assembly is that acid from the battery tends to corrode the nuts and bolts of the battery mounting bracket, so that it is most difficult to remove the nuts from the bolts when it is desired to service or replace the battery. Another drawback in the prior art assembly is that since storage batteries come in a variety of sizes, many different sizes of the prior art bolts must be kept in stock.

An important object of the present is to overcome the problems of corrosion and battery size differentials by the provisions of adjustable bolt assemblies which may be easily adjusted to accommodate any percent day storage battery, and which are formed of a suitable hard plastic, such as an acrylic plastic, as to corrosion proof and yet strong enough securely to hold the battery in place.

Summary of the invention

The invention provides a plastic adjustable side bolt assembly for a storage battery supporting bracket. The side bolt of the invention comprises a stud-like elongated member formed of hard plastic and having a first threaded portion of a cylindrical shape and also having a second flattened portion, and a flat strip member formed of hard plastic and having an end portion formed with a hook configuration. One of the two members has aligned apertures therein, and the other has an integral transversely protruding stud which is selectively received by the apertures in the first member, so as to provide an adjustable length for the assembly. A plastic nut is provided for holding the side bolt in an assembled condition with the supporting bracket.

Brief description of the drawings

FIGURE 1 shows a typical battery supporting bracket assembly incorporating side bolts constructed in accordance with the concepts of the invention;

FIGURE 2 is a perspecive of a side bolt assembly constructed in accordance with one embodiment of the invention; and FIGURE 3 is a perspective of a side bolt assembly constructed in accordance with a second embodiment of the invention.

Description of the illustrated embodiments

As shown in FIGURE 1, the storage battery 10 of a motor vehicle, or the like, is usually supported in a pan 12, the pan being appropriately mounted to the chassis of the vehicle. The battery is supported on the pan by means of a pair of side bolts 14 which, in the present instance, are constructed to incorporate the concepts of the present embodiment.

The upper ends of the side bolts 14 are threaded, and the threaded upper ends pass through holes at the ends of a bracket 16. The bracket 16 extends across the top of the battery 10. Nuts 18 are threaded onto the ends of the side bolts 14, and these nuts are tightened down against the bracket 16, securely to hold the battery in place on the pan 12.

As mentioned above, it is usual in the prior art to form the side bolts, nuts and top bracket of the battery holding assembly of metal. However, the metal parts tend to corrode, so that it is often difficult to remove the nuts 18 when the battery is to be removed for servicing or renewal purposes.

In the practice of the present invention, and as shown, for example, in FIGURES 2 and 3, the side bolt assemblies have a particular configuration, so that they can be adapted to a wide variety of battery sizes. Also, the side bolts, nuts and washer are formed of a hard plasttic material, so as to be corrosion proof. It has been found that an acrylic plastic is suitable for the purpose. However, many other types of hard plastic materials may be used.

In the embodiment shown in FIGURE 2, the side bolt assembly is made up of a first stud-like elongated plastic member 20. The upper portion of the plastic member 20 has a cylindrical configuration, and it is threaded to receive a plastic nut 22 and plastic washer 24. The lower end of the elongated member 20 is flattened, and a series of axially spaced openings 22, 24 and 26 are formed therein.

The side bolt assembly of FIGURE 2 includes a second plastic portion which, in the illustrated embodiment, is in the form of a flat strip 28. The lower end of the flat strip 28 is formed with a hook-shaped configuration, so that it may hook into the side of the pan 12. The upper end of the strip 28 has a transverse portion which may selectively be received by anyone of the openings 22, 24 or 26 depending upon the size of the battery to be supported and held by the holders.

The embodiment shown in FIGURE 3 likewise includes two separate parts, each made of a plastic material. The first part is designated 50, and it also has a threaded upper portion which receives a plastic nut 52 and plastic washer 54. The lower portion of the member 50 is flattened, as in the previous embodiment. However, instead of openings, a stud 56 is formed in the lower portion of the member 50, and the stud protrudes out from the plane of the lower portion.

A second member 58 is also provided, and it like the member 28 of the previous embodiment, is provided with a hook-shaped configuration at its lower extremity, which may be hooked into the side of the pan 12. A plurality of slots 60, 62 and 64 are provided at spaced axial locations on the member 58. The configuration of the slots, as compared with the configuration of the head of the stud 56 is such that the member 58 must be turned 90° with respect to the member 50 before it can be hooked onto the stud 56. Then, when the member 58 is hooked into the stud, it is turned into axial alignment with the member 50, as shown in FIGURE 3. In the latter position, the member 58 is locked on the stud 56. However, it may easily be removed merely by turning it through 90°. The holder of FIGURE 3 is, therefore, readily adjustable to different lengths so as to suit different battery sizes.

In both embodiments illustrated in FIGURES 2 and 3, and described above, the battery side bolts, and associated nuts, washers and bracket or strap, are formed of a rigid hard plastic material, so as to be corrosion proof. This means that regardless of the state of the supported storage battery 10, the nuts 22 or 52 and associated washers 24 or 54 can be easily removed, permitting the bracket 16 to be withdrawn so that the battery 10 may be lifted off the pan 12 for replacement or servicing purposes.

Also, there is no need to maintain different sizes of the illustrated size bolts in stock as the side holders are constructed to be suitable for use with a wide variety of storage battery sizes.

While particular embodiments have been shown and described, modifications may be made, and it is intended in the claims to cover all modifications which fall within the scope of the invention.

What is claimed is:

1. An adjustable side bolt assembly for a storage battery supporting bracket, including: a first stud-like elongated member formed of hard plastic and having a first threaded portion of a cylindrical configuration and having a second flattened portion, and a second elongated flat strip member formed of hard plastic and having an end portion with a hook configuration, one of said members having axially aligned apertures therein, and the other of said members having a transversely-protruding stud integral therewith to be selectively received by said apertures, and a nut formed of hard plastic material threaded onto said first threaded portion for holding said side bolt assembly in said supporting bracket, the assembly having a length determined by the particular one of the aforesaid apertures receiving said protruding stud.

2. The side bolt assembly defined in claim 1, in which said aligned apertures are formed in said flattened portion of said first member, and in which said stud is formed at the end of said second member.

3. The battery assembly defined in claim 1, in which said aligned apertures are formed in said second flat strip member, and said stud is formed in said flattened portion of said first member.

4. The battery holder defined in claim 1 in which said first and second elongated members are formed of an acrylic plastic material.

References Cited

UNITED STATES PATENTS

| | | | |
|---|---|---|---|
| 801,383 | 10/1905 | King et al. | 248—496 |
| 1,429,952 | 9/1922 | Kearney | 180—68.5 |
| 1,636,562 | 7/1927 | Hick | 248—361 XR |
| 2,969,216 | 1/1961 | Hallsey | 248—71 |
| 2,994,395 | 8/1961 | Hall | 180—68.5 |
| 3,273,837 | 9/1966 | Willert et al. | 248—59 |

JOHN PETO, *Primary Examiner.*

U.S. Cl. X.R.

180—68.5